(12) United States Patent
Oximberg et al.

(10) Patent No.: US 7,565,731 B2
(45) Date of Patent: Jul. 28, 2009

(54) METHODS OF MANUFACTURING A ROTOR ASSEMBLY

(75) Inventors: Carol A. Oximberg, Los Angeles, CA (US); Shioping P. Oyoung, Fullerton, CA (US); Richard W. Fraser, Orange, CA (US); Wei-Shing Chaing, Diamond Bar, CA (US); Mark Gee, South Pasadena, CA (US)

(73) Assignee: Honeywell International Inc., Morristown, NJ (US)

( * ) Notice: Subject to any disclaimer, the term of this patent is extended or adjusted under 35 U.S.C. 154(b) by 289 days.

(21) Appl. No.: 11/194,288

(22) Filed: Aug. 1, 2005

(65) Prior Publication Data

US 2007/0024140 A1 Feb. 1, 2007

(51) Int. Cl.
*H02K 15/03* (2006.01)
*H02K 1/27* (2006.01)
*H02K 1/28* (2006.01)

(52) U.S. Cl. .................. 29/598; 29/607; 310/156.12; 310/156.22

(58) Field of Classification Search ............ 29/596, 29/598, 466, 525.02, 607; 310/156.22, 156.12
See application file for complete search history.

(56) References Cited

U.S. PATENT DOCUMENTS

| 2,161,953 | A | * | 6/1939 | Dunham et al. | 310/156.22 |
|---|---|---|---|---|---|
| 3,742,264 | A | * | 6/1973 | Anderson et al. | 310/42 |
| 5,010,638 | A | | 4/1991 | Lanfranco | 29/596 |
| 6,122,817 | A | | 9/2000 | Meacham et al. | 29/598 |
| 6,661,145 | B1 | | 12/2003 | Nilson | 310/156.22 |
| 6,735,281 | B2 | * | 5/2004 | Higgins et al. | 378/132 |
| 6,803,695 | B2 | | 10/2004 | Yamamoto et al. | 310/261 |
| 7,148,598 | B2 | * | 12/2006 | Ionel et al. | 310/156.55 |

* cited by examiner

*Primary Examiner*—A. Dexter Tugbang
*Assistant Examiner*—Livius R Cazan
(74) *Attorney, Agent, or Firm*—Oral Caglar, Esq.

(57) ABSTRACT

A method for manufacturing a rotor assembly. The method includes providing a stub shaft having a first part and a second part, providing a magnet between the first part and the second part, and compressing the magnet between the first part and the second part using a connecting device. The method also includes drilling a hole through the first part and the magnet, cooling an inner shaft, and inserting the inner shaft into the hole.

13 Claims, 8 Drawing Sheets

Section A-A

Section A-A

Section A-A

Section A-A

Section A-A

Section A-A

METHODS OF MANUFACTURING A ROTOR ASSEMBLY

FIELD OF THE INVENTION

The invention relates generally to rotors, and more particularly to a two pole permanent magnet rotor and method of manufacturing the same.

DESCRIPTION OF THE RELATED ART

A rotor generally has an inner sleeve with a magnet positioned around the inner sleeve. The magnet is generally slip fit over the inner sleeve. During high speed operations, the magnet is exposed to high centrifugal stresses that may cause the magnet to separate from the inner sleeve. When the magnet separates from the inner sleeve, the rotor losses its dynamic balance and induces high vibration into the machine structure. Once the magnet separates from the inner sleeve, the rotor cannot be repaired and therefore must be thrown away.

Thus, it should be appreciated that there is a need for a rotor that maintains an interference fit during high speed operations. The invention fulfills this need as well as others.

SUMMARY OF THE INVENTION

The invention relates to methods for manufacturing a rotor assembly. In particular, and by way of example only, one embodiment of the invention is a method for making a rotor assembly including providing a left part and a right part of a stub shaft, providing a magnet between the left part and the right part of the stub shaft, and inserting a plurality of screws into the left part and the right part of the stub shaft to hold the magnet in place. The method further includes drilling a hole through the magnet, cooling an inner shaft, and inserting the inner shaft into the hole.

One embodiment of the invention is a method for manufacturing a rotor assembly. The method includes providing a stub shaft having a first part and a second part, providing a magnet between the first part and the second part, and compressing the magnet between the first part and the second part using a connecting device. The method also includes drilling a hole through the first part and the magnet, cooling an inner shaft, and inserting the inner shaft into the hole.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1B:
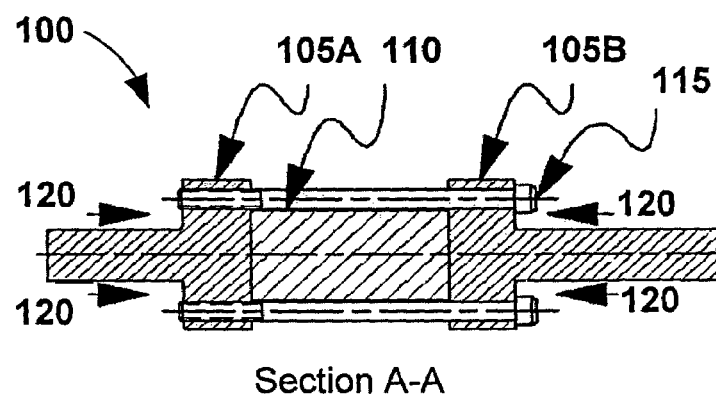
FIG. 1B is a cross-sectional view along line A-A shown in FIG. 1A of the rotor assembly according to an embodiment of the invention.
Figure 1A:
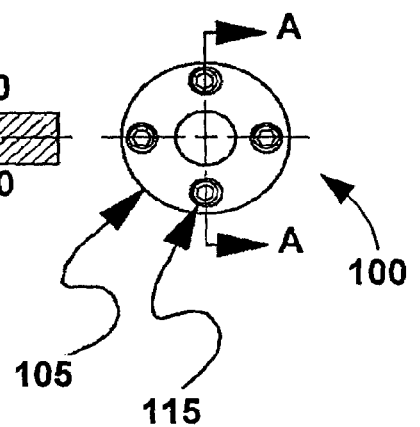
FIG. 1A is an end view of a rotor assembly having a stub shaft and a plurality of screws according to an embodiment of the invention.

Referring now more particularly to the drawings, FIG. 1A is an end view of a rotor assembly 100 having a stub shaft 105 and a plurality of screws 115. FIG. 1B is a cross-sectional view along line A-A shown in FIG. 1A of the rotor assembly 100. The stub shaft 105 maybe made of an Inconnel Steel 718 material and the plurality of screws 115 may be made of an Inconnel Steel 718 material. In one embodiment, the stub shaft 105 includes a left part 105A and a right part 105B (step 805). The rotor assembly 100 also includes a magnet 110 that may be positioned between the left part 105A and the right part 105B (step 810). The plurality of screws 115 (e.g., four screws) may be inserted as shown and are generally tightened to compress the magnet 110 with the help of an external device represented by arrows 120 (step 815).

Figure 2:
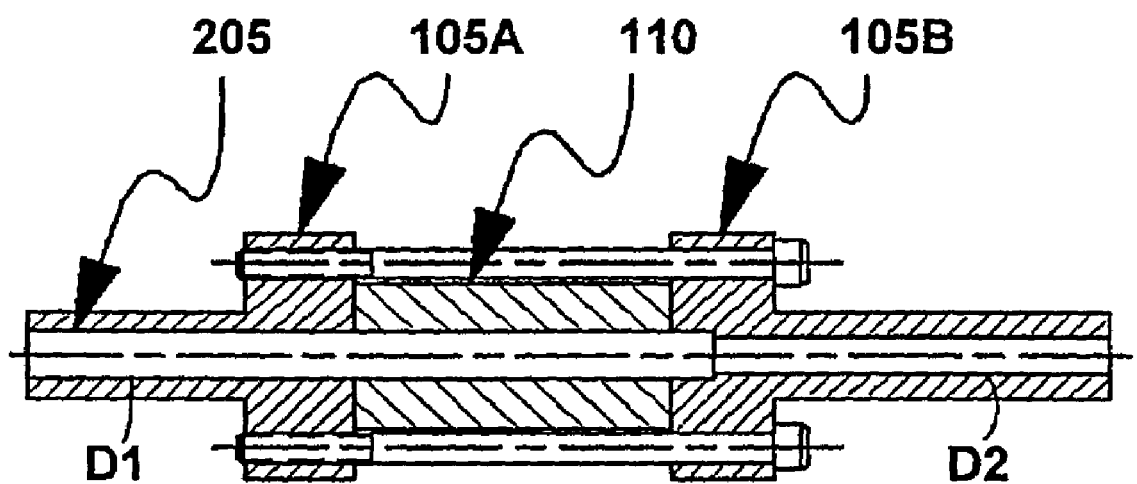
FIG. 2 is a cross-sectional view of the rotor assembly having a hole according to an embodiment of the invention.

FIG. 2 is a cross-sectional view of the rotor assembly 100 having a hole 205. A drill or other piercing device can be used to drill the hole 205 through the left part 105A of the stub shaft 105, the magnet 110 and the right part 105B of the stub shaft 105 (step 820). As shown, the hole 205 may have a first diameter D1 that is larger than a second diameter D2. This can be accomplished by first drilling a hole with the second diameter D2 through the left part 105A of the stub shaft 105, the magnet 110 and the right part 105B of the stub shaft 105. Then, drilling a hole with the larger first diameter D1, along substantially the same axis, through the left part 105A of the stub shaft 105, through the magnet 110 and partly through the right part 105B of the stub shaft 105. This will produce a hole with two diameters.

Figure 3:
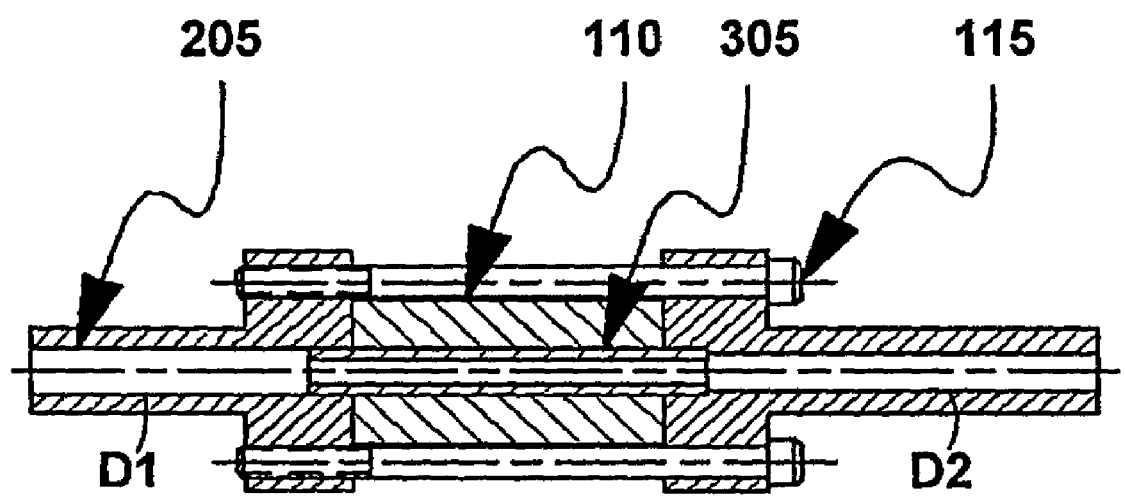
FIG. 3 is a cross-sectional view of the rotor assembly with an inner shaft inserted into the hole according to an embodiment of the invention.

FIG. 3 is a cross-sectional view of the rotor assembly 100 with an inner shaft 305 inserted into the hole 205. The inner shaft 305 may be made of a non-magnetic steel such as a Inconnel Steel 718 material capable of contracting when cooled and expanding when heated. Prior to insertion into the hole 205, the inner shaft 305 is cooled to between about −185° C. and −170° C. and then inserted into the hole 205 (steps 825 and 830). When the inner shaft 305 is cooled, the diameter of the inner shaft 305 shrinks so that it is slightly smaller than the first diameter D1 but larger than the second diameter D2, which allows the inner shaft 305 to be inserted into the hole 205. The inner shaft 305 is generally inserted to a vertical plane defined by the intersection of the first diameter D1 and the second diameter D2. After insertion, the diameter of the inner shaft 305 expands as its temperature rises to room temperature. The inner shaft 305 has a positive tight fit in the hole 205. That is, the inner shaft 305 is tightly fit into the stub shaft 105 and the magnet 110. Since the inner shaft 305 is tightly fit into the stub shaft 105, it cannot be removed without destroying the stub shaft 105 and the magnet 110.

Figure 4:
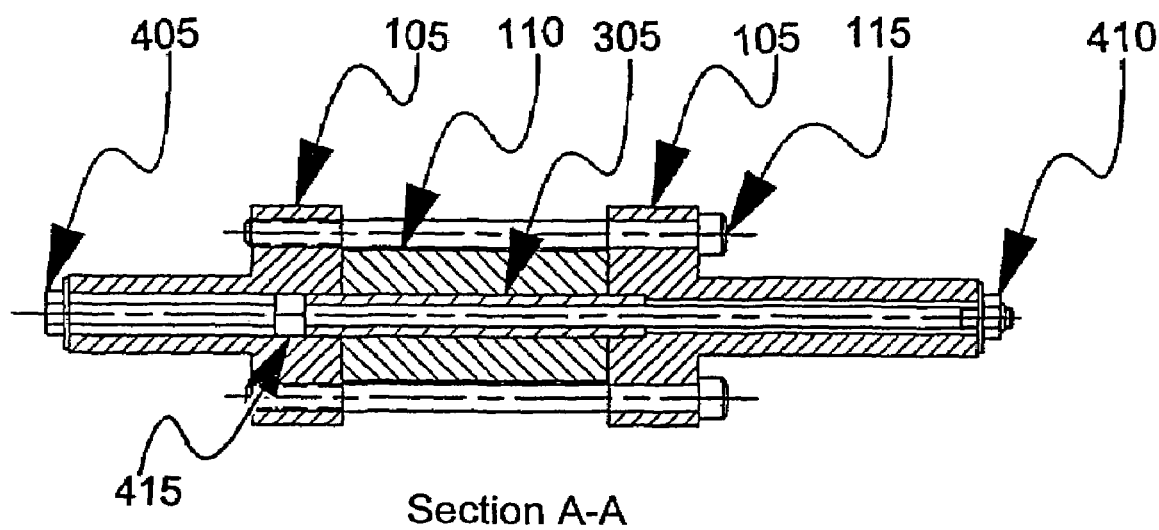
FIG. 4 is a cross-sectional view of the rotor assembly with a screw bolt inserted into the inner shaft according to an embodiment of the invention.

FIG. 4 is a cross-sectional view of the rotor assembly 100 with a bolt or a tie rod 405 inserted into or through the inner shaft 305 (step 835). The tie rod has a shoulder or flange 415 that is positioned against the inner shaft 305 to hold the inner shaft 305 in place. A nut 410 is used to hold the tie rod 405 in place and to compress the magnet 110. The tie rod 405 and the nut 410 can be tightened to place or keep the stub shaft 105 and the magnet 110 under compression (step 840).

Figure 5:
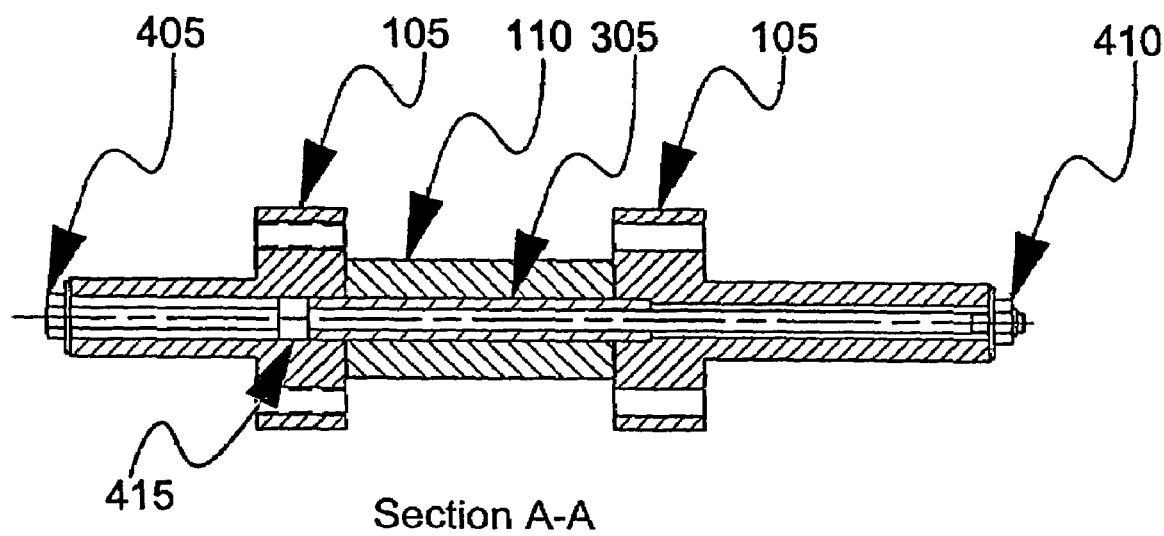
FIG. 5 is a cross-sectional view of the rotor assembly with the plurality of screws removed according to an embodiment of the invention.

FIG. 5 is a cross-sectional view of the rotor assembly 100 with the plurality of screws 115 removed (step 845). Even though the plurality of screws 115 have been removed, the stub shaft 105 and the magnet 110 are still kept together or under compression by the tie rod 405 and the nut 410.

Figure 6:
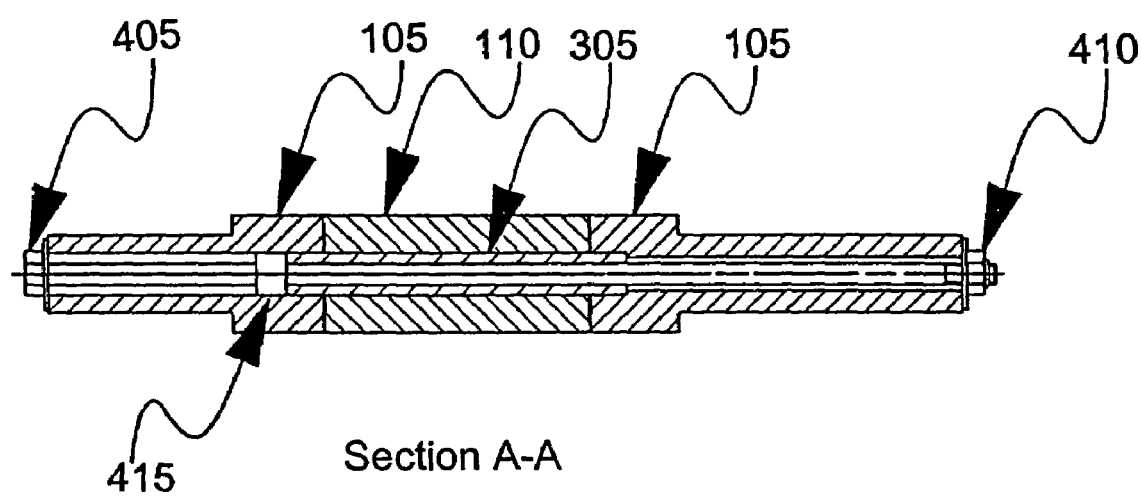
FIG. 6 is a cross-sectional view of the rotor assembly where the stub shaft has been grinded to the surface of the magnet according to an embodiment of the invention.

FIG. 6 is a cross-sectional view of the rotor assembly 100 where the stub shaft 105 has been grinded to the surface of the magnet 110 (step 850). Now, the stub shaft 105 is flush with the magnet 110.

Figure 7:
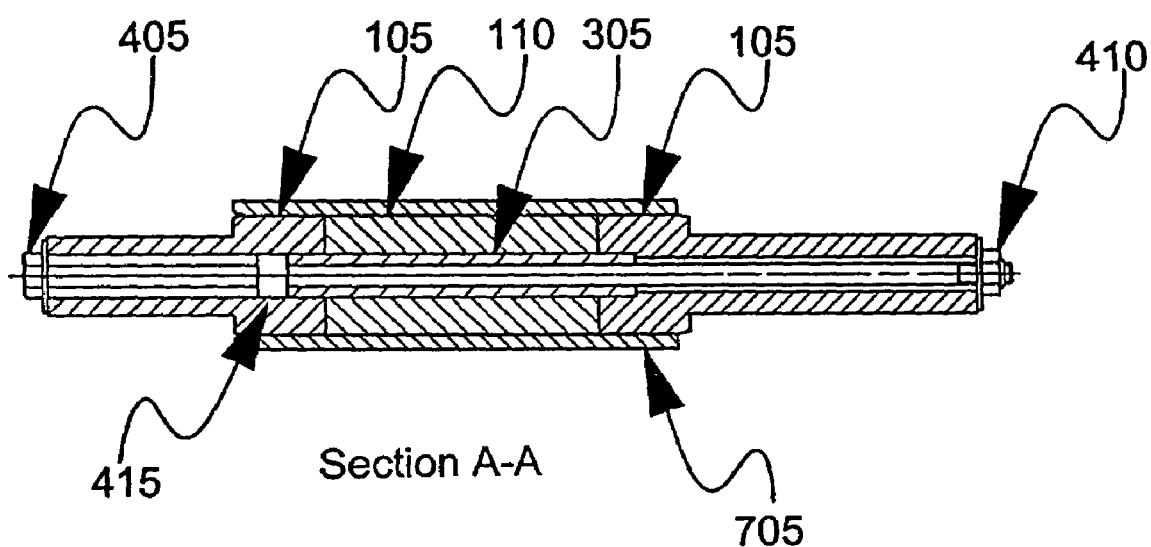
FIG. 7 is a cross-sectional view of the rotor assembly where the stub shaft and the magnet are surrounded by an outer sleeve according to an embodiment of the invention.
Figure 8:
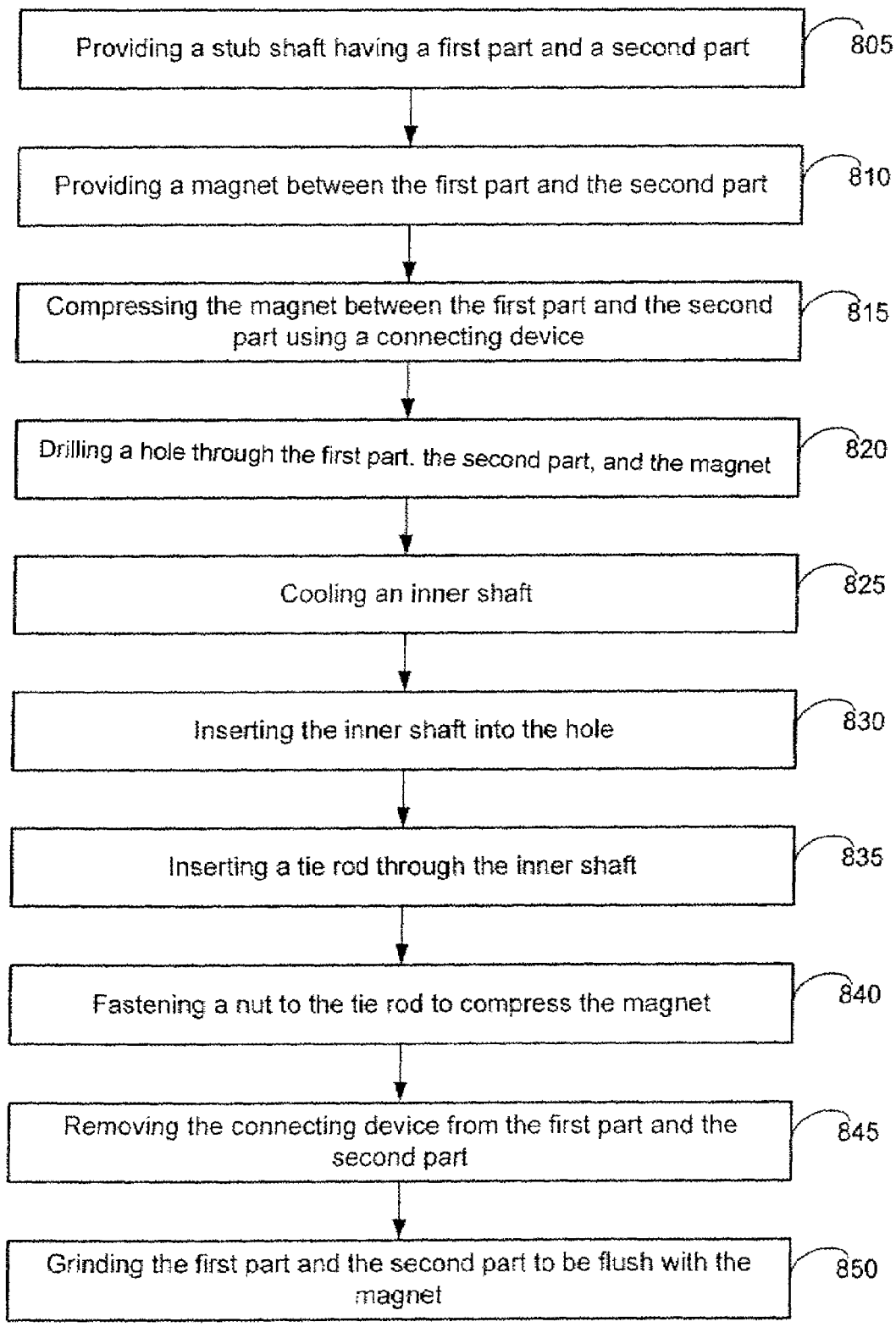
FIG. 8 is a flowchart illustrating a method of manufacturing the rotor assembly according to an embodiment of the invention.

FIG. 7 is a cross-sectional view of the rotor assembly 100 where the stub shaft 105 and the magnet 110 are surrounded by an outer sleeve 705. The outer sleeve 705 provides the rotor containment when the rotor is spinning.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A method for making a rotor assembly, comprising:
providing a left part and a right part of a stub shaft, each of the left part and the right part of the stub shaft having a stub shaft diameter;
providing a magnet between the left part and the right part of the stub shaft, the magnet having a magnet diameter smaller than the stub shaft diameter;
inserting a plurality of screws into the left part and the right part of the stub shaft to hold the magnet in place;
drilling a hole through the magnet, the left part and the right part of the stub shaft;
cooling an inner shaft;
inserting the inner shaft into the hole, the inner shaft extending through the magnet and further extending into the left part and the right part of the stub shaft;
warming the inner shaft to provide an interference fit of the inner shaft in the hole; and
removing the plurality of screws from the left part and the right part of the stub shaft.

2. The method as defined in claim 1, further comprising inserting a tie rod through the inner shaft.

3. The method as defined in claim 2, further comprising fastening a nut to the tie rod to compress the magnet.

4. The method as defined in claim 1, further comprising grinding the left part and the right part of the stub shaft to be flush with the magnet.

5. The method as defined in claim 1, further comprising inserting the inner shaft into the hole through the left part of the stub shaft.

6. The method as defined in claim 1, wherein the inner shaft is cooled to a temperature of between about −185° C. and −170° C.

7. The method as defined in claim 1, wherein the hole has a first diameter and a second diameter that is larger than the first diameter.

8. The method as defined in claim 1, wherein the plurality of screws compress the magnet in place.

9. The method as defined in claim 1, further comprising inserting the left part, the right part, the magnet and the inner shaft into an inside diameter of an outer sleeve.

10. A method for making a rotor assembly, comprising:
providing a stub shaft having a first part and a second part, the stub shaft having a first stub shaft diameter;
providing a magnet between the first part and the second part, the magnet having a magnet diameter, the magnet diameter being smaller than the first stub shaft diameter;
compressing the magnet between the first part and the second part of the stub shaft using a connecting device, the connecting device passing from the first part to the second part of the stub shaft without passing through the magnet;
drilling a hole through the first part, the second part and the magnet;
cooling an inner shaft;
inserting the inner shaft into the hole, the inner shaft extending through the magnet and further extending into the first part and the second part of the stub shaft;
warming the inner shaft to provide an interference fit in the hole;
inserting a tie rod through the inner shaft;
fastening a nut to the tie rod to compress the magnet; and
removing the connecting device from the first part and the second part of the stub shaft while keeping the stub shaft and the magnet together.

11. The method as defined in claim 10, further comprising grinding the first part and the second part of the stub shaft to be flush with the magnet.

12. The method as defined in claim 10, wherein drilling comprises drilling the hole so as to have a first diameter and a second diameter larger than the first diameter.

13. The method as defined in claim 10, wherein the inner shaft is cooled to a temperature of between about −185° C. and −170° C.

* * * * *